United States Patent [19]

Clark

[11] 3,924,936
[45] Dec. 9, 1975

[54] METHOD OF AND APPARATUS FOR ALIGNING OPTICAL LENSES

[75] Inventor: James A. Clark, Mendon, N.Y.

[73] Assignee: Bausch & Lomb Incorporated, Rochester, N.Y.

[22] Filed: July 20, 1973

[21] Appl. No.: 381,305

Related U.S. Application Data

[63] Continuation of Ser. No. 883,213, Dec. 8, 1969, abandoned.

[52] U.S. Cl. .................................. 350/252; 350/178
[51] Int. Cl. ............................................. G02b 7/02
[58] Field of Search ............................... 350/40–44, 350/46, 47, 159, 178, 245–257

[56] References Cited
UNITED STATES PATENTS

| | | | |
|---|---|---|---|
| 1,057,262 | 3/1913 | Oldfield | 350/252 |
| 1,331,174 | 2/1920 | Wescott | 95/45 |
| 2,110,477 | 3/1938 | Wittel | 350/252 |
| 2,794,360 | 6/1957 | Eagle | 350/257 |
| 3,205,774 | 9/1965 | Estes | 350/253 |
| 3,441,339 | 8/1969 | Rederer | 350/255 |
| 3,601,476 | 8/1971 | Mackenzie | 350/310 |

FOREIGN PATENTS OR APPLICATIONS

| | | | |
|---|---|---|---|
| 8,934 | 2/1892 | United Kingdom | 350/252 |

*Primary Examiner*—Alfred E. Smith
*Assistant Examiner*—Michael J. Tokar
*Attorney, Agent, or Firm*—Frank C. Parker; Bernard D. Bogdon

[57] ABSTRACT

An apparatus for boring a lens cell and for aligning a lens comprises an adjustable workpiece platform carrying fixtures for positioning a lens cell having two peripheral reference projections engaging a fixture block. A spindle transversely aligned with the workpiece platform and coaxially aligned with the fixture block is operational to bore the lens cell to thereby provide a seating surface for the lens. A lens trueing bell, coaxially aligned with the operating spindle, engages the lens and aligns its optical axis substantially transversely to the lens cell surface resting upon the platform and to the axis of the lens cell seating surface. The assembly comprising the lens cell and lens is accurately optically alignable with other similarly formed assemblies by colinearly disposing their projections.

10 Claims, 10 Drawing Figures

METHOD OF AND APPARATUS FOR ALIGNING OPTICAL LENSES

This is a continuation application of application Ser. No. 883,213, filed Dec. 8, 1969, now abandoned.

BACKGROUND OF THE INVENTION

1. Field of the Invention

This invention relates to a method and an apparatus for optically aligning lenses and more particularly, to lens cells for alignment by referencing, to an apparatus having an adjustable workpiece platform for fixturing a lens cell to perform operational techniques thereon, including machining and lens alignment and to a method of providing the optical alignment.

2. Description of the Prior Art

Generally in order to provide very accurate optical alignment of a lens and a lens cell, it is necessary to closely tolerance the lens cell to its assembly housing mounting. Since most lenses have substantially circular peripheries, the lens cells are most generally cylindrical and are snugly fitted to the assembly by closely tolerancing the periphery of the cell and the cylindrical surface of the housing against which the cell mounts. In the process of alignment of a lens system, it will be appreciated that the lens cell is either press fit to the cylinder, promoting assembly difficulties or its periphery contacts the inner cylindrical surface of the housing at only one arbitrary point due to their loose fit, promoting alignment difficulties. Hence, there is no consistent orientation of each lens cell to provide a common optical axis throughout a system involving a plurality of lenses and lens cells. Without exceptional close tolerancing and extreme care being taken in the assembly of such a system, these practices will not produce optical equipment of very high caliber. As is well known, the greater the tolerance requirements and the more time consummed during the assembly the higher the cost to manufacture and the lower the yield.

SUMMARY OF THE INVENTION

Embodiments of the present invention provide for optical subassemblies which are readily optically alignable to a predetermined axis of a major assembly to thereby provide a common optical axis throughout a system, where a plurality of lenses are involved. A machine, according to the principles of the present invention, for accomplishing the desired coaxial optical alignment in a system, includes an operating spindle and an adjustable workpiece platform having a fixture for positioning a workpiece such as an optical unit comprising an optical lens cell. The spindle and the platform are angularly and translationally alignable to within very small tolerances. Alignment of the fixture to the operating spindle provides for ease of positioning and alignment of the optical unit to be operated thereon and the machine produces optical units having optical axes which are consistent and each axis can be related to the axes of other similarly constructed units to provide for an optical system of very great accuracy. The method of providing accurately aligned optical systems involves aligning the fixture on the platform for positioning the workpiece to the operating spindle and for referencing completed workpieces within an optical assembly for aligning the optical units of a system.

BRIEF DESCRIPTION OF THE DRAWINGS

FIG. 6 is a plan view of a fixtured optical lens cell according to the principles of the present invention, including reference projections and a recess;

DETAILED DESCRIPTION OF THE PREFERRED EMBODIMENTS

Figure 1:
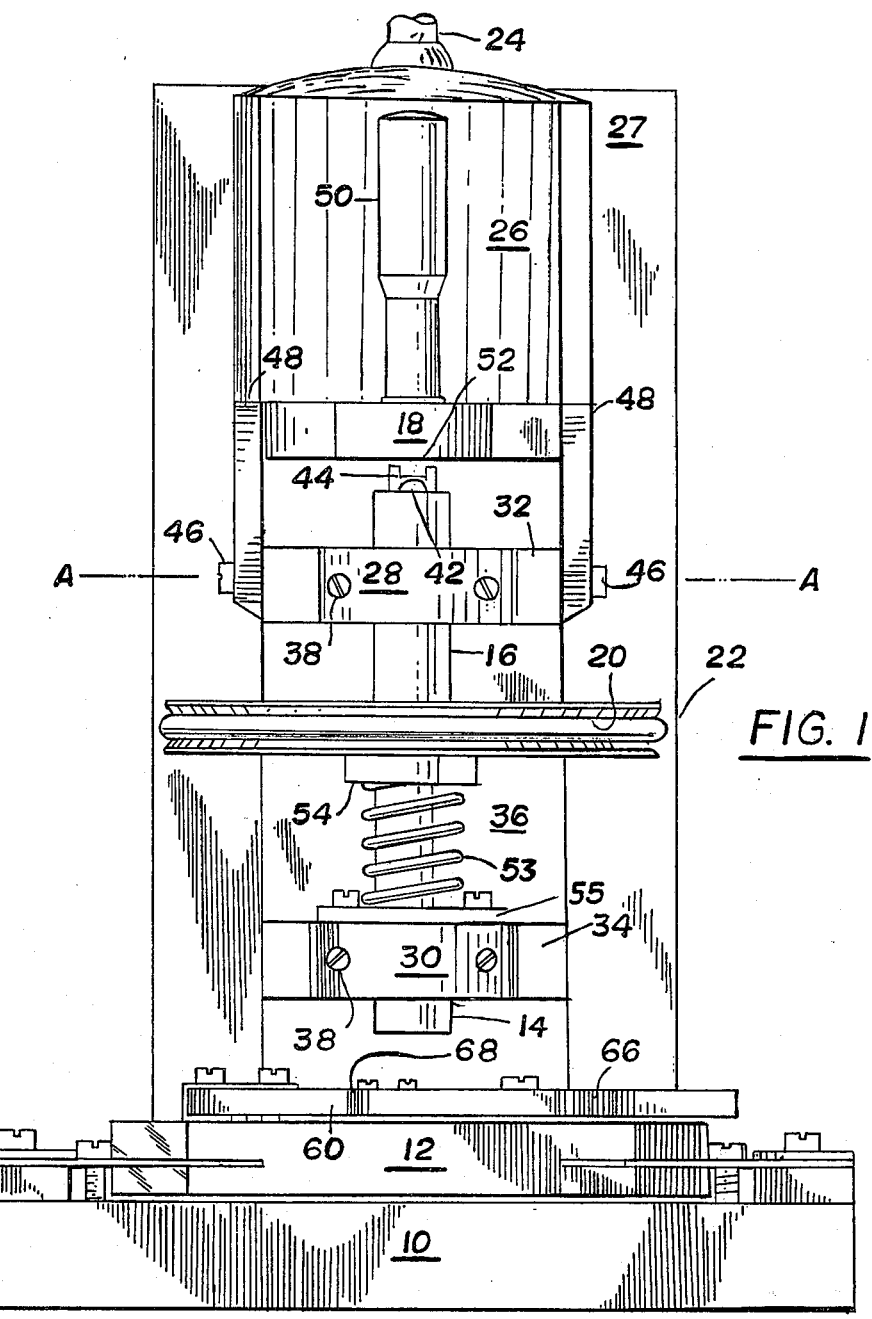
FIG. 1 illustrates a front view of an apparatus according to the principles of the present invention.
Figure 4:
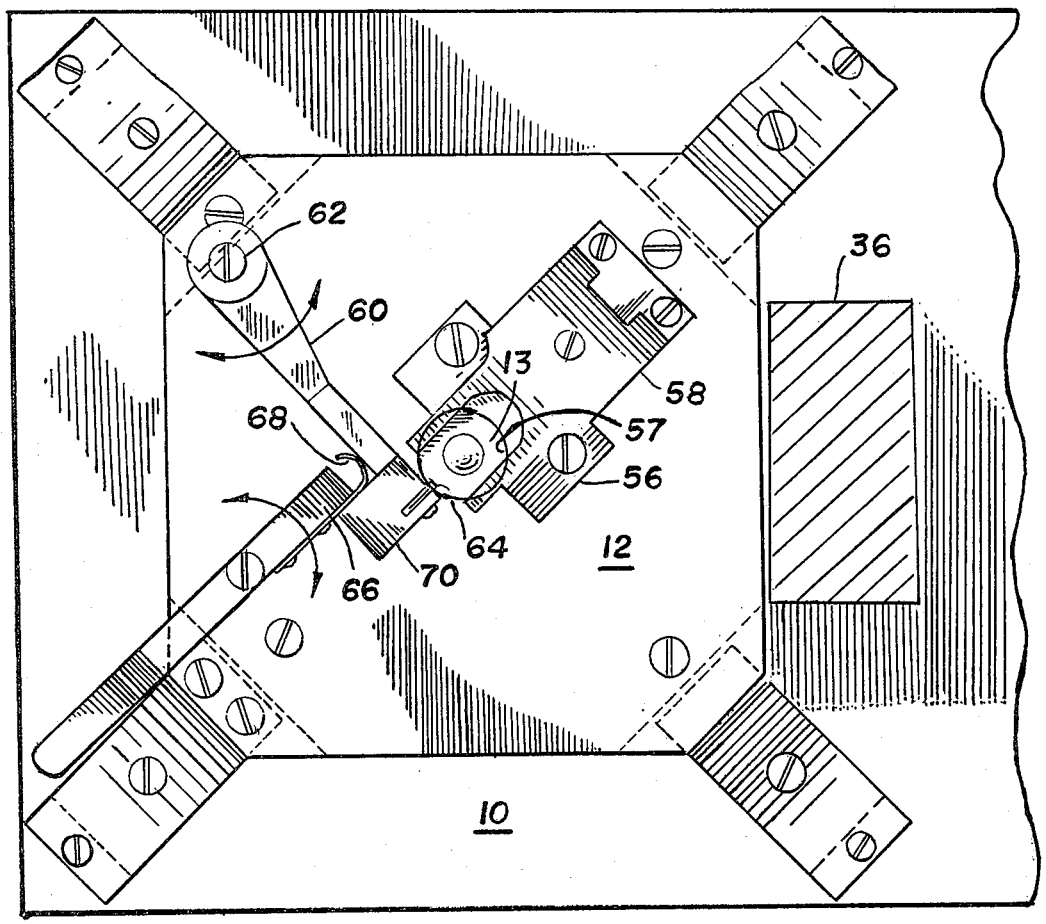
FIG. 4 is a fragmentary sectional plan view of the apparatus of FIG. 3 along the plane of line 4—4 of FIG. 3.
Figure 5:
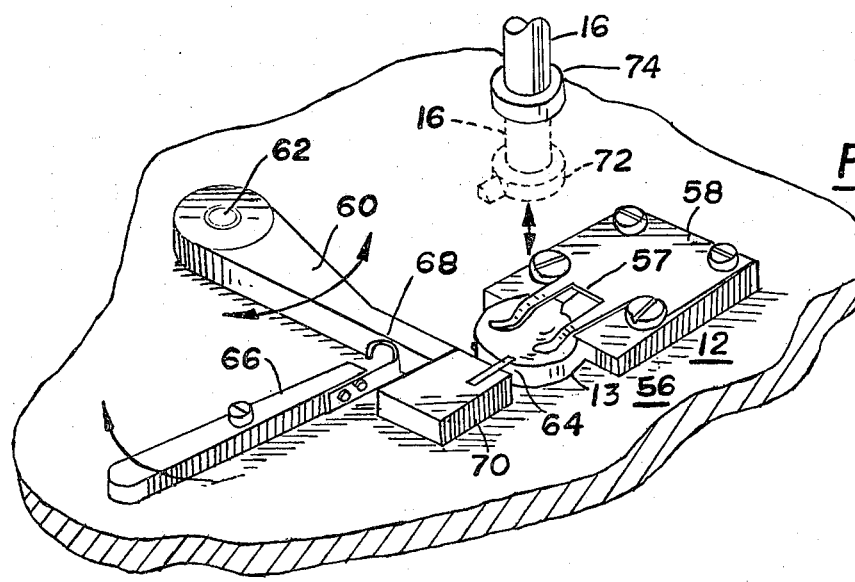
FIG. 5 is a fragmentary perspective sectional view of a workpiece fixtured on a platform in preparation for an operation with the operating spindle of the apparatus of FIG. 1.

A machine, according to the principles of the present invention, is illustrated in FIG. 1 and comprises, generally, a base 10 supporting an adjustable workpiece platform 12 for mounting a workpiece 13, as best seen in FIGS. 4 and 5, to be operated upon by an operating tool 14 carried by a rotatable operating spindle 16 disposed for vertical movement by means of a hand operating lever 18. For rotating the spindle 16 there is affixed thereto a pulley 20 having a V-shaped groove about its periphery for engaging a pulley belt 22. For powering the pulley 20 the belt 22 also engages a pulley (not shown) affixed to the armature spindle 24 of an electrical powering motor 26 carried by a vertical support 27 affixed to the base 10.

The workpiece 13 is generally cylindrical and is preformed to have the planes defining its end surfaces parallel and accurately spaced. It is preferred that an optical lens cell be preformed, for example, by a sintering process to include an open passageway between its ends to provide an optical path.

The operating spindle 16 is vertically disposed having an upper and a lower mounting at clamps 28 and 30 secured to structural appendages 32 and 34, respectively. The structural appendages 32 and 34 extend outwardly from a support pillar 36 rigidly affixed to the base 10, to form an integral construction. The spindle 16 is ground and lapped to within millionths of an inch for straightness and roundness to achieve accuracy in the end product.

Figure 2:
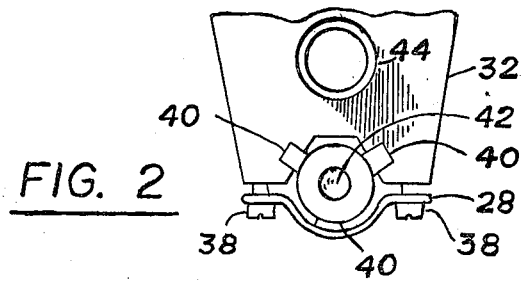
FIG. 2 is a fragmentary plan view of the upper end of an operating spindle and bearings of FIG. 1.

As typically shown in FIG. 2, clamp 28 has machine screws 38 passing therethrough on opposite sides of the operating spindle 16 to threadingly engage structural appendage 32. Self lubricating, low wearing and low friction property bearings 40 are engaged with the operating spindle 16 about its periphery. Two bearings 40 are engaged as inserts in the appendage 32 and another is affixed to the underside of the clamp 28. These bearings may, for example, be formed of "Graphitar" a product of the United States Graphite Company of Saginaw, Mich.

Figure 3:
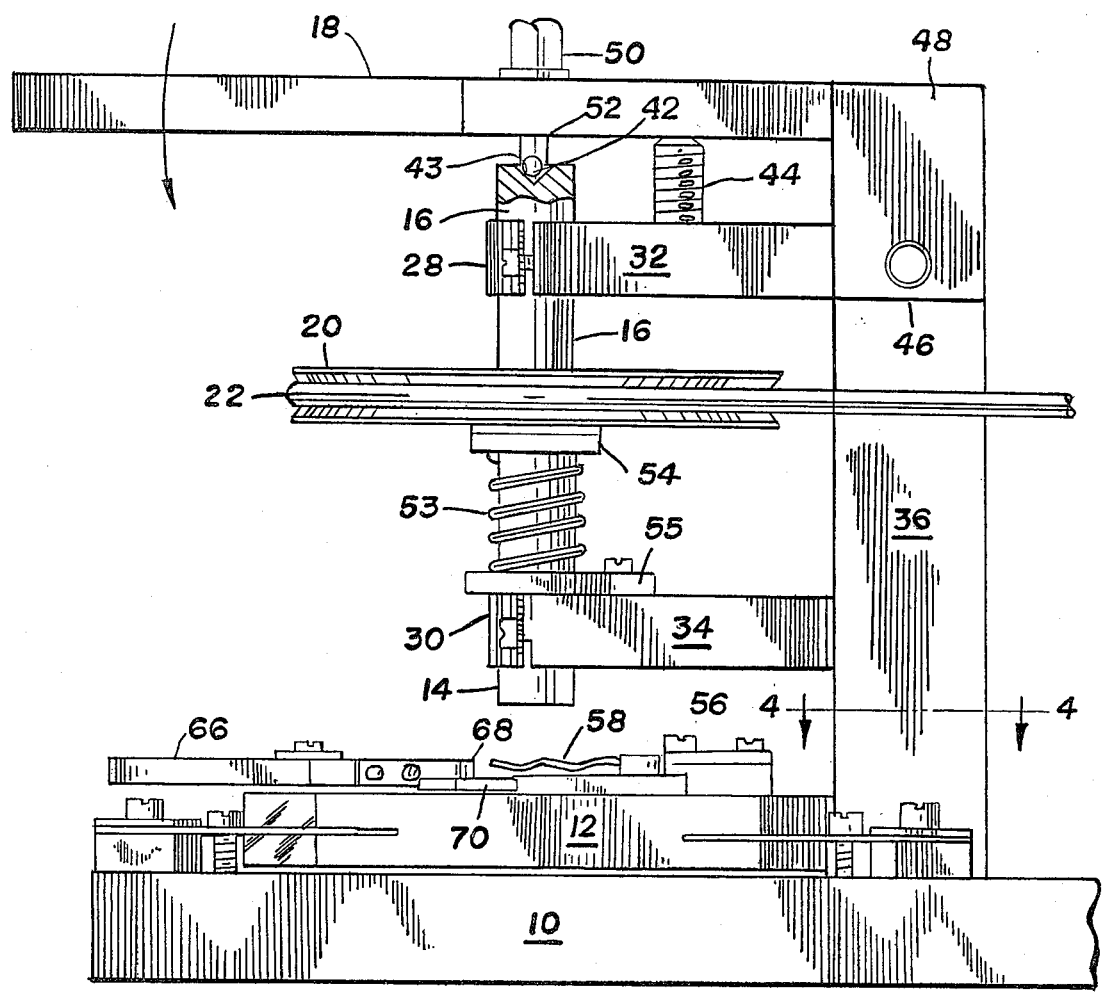
FIG. 3 is a fragmentary lateral view of the apparatus of FIG. 1.

The hand operating lever 18 is pivotally about an axis A—A defined by the axes of machine screws 46. The screws 46 pass through supports 48 transversely extending from the lever 18 and the screws 46 are disposed on opposite sides of the spindle 16 to threadingly engage the support pillar 36. The hand lever 18, as illustrated in FIG. 1, is in a lowered position engaging a thrust bearing 42. As best seen in FIG. 3, the thurst bearing 42 is formed as a spherical ball bearing within a conical pocket 43 symmetrically formed on the vertical axis of the operating spindle 16. When engaged, the thrust bearing 44 transmits the exerted downward operating force along the axis of the spindle 16 to cause the spindle 16 within its clamps 28 and 30 to travel true. As a limit to the downward movement of the operating lever 18 there is provided an adjustable stop 44 threadingly engaging the structural appendage 32.

For axially positioning the operating tool 14 relative to the workpiece 13, a micrometer 50 is provided. The micrometer 50 is affixed to the operating lever 18 and has an adjustable shaft 52 extending therethrough to the thrust bearing 42 for determining the extent the operating tool 14 is lowered. For returning the operating spindle 16 to its upper most position when disengaged by the operating lever 18, there is provided a coil spring 53, disposed about the spindle 16 between a hub 54 integral with the pulley 20 and a stop plate 55 affixed to the structural appendage 34 in any suitable manner, such as by means of machine screws.

As hereinbefore mentioned, the workpiece 13 is mounted to a workpiece platform 12 and is supported thereon by fixtures accurately aligned to the operating spindle 16. In the illustrated embodiments, the workpiece platform 12 is transversely aligned and is translated to a position where the axis of the operating spindle 16 and the axis of the positioning fixture on the workpiece platform 12 are coaxial. This is accomplished by methods and apparatus disclosed in my copending application Ser. No. 883,044, now U.S. Pat. No. 3,704,846, issued Dec. 5, 1972.

FIGS. 3, 4 and 5 best illustrate the fixture for mounting the workpiece 13 on the workpiece platform 12. For positioning the workpiece 13, a mounting block 56 having a substantially circular cutout 57 having a perimeter comprising an arc of, for example, 130° to 180° of a full circle is affixed to the top surface of the workpiece platform 12. The mounting block 56 is disposed for coaxial alignment of the axis of the operating shaft 16 and the axis of the circle forming the arc 57 in the mounting block 56. Alignment between the operating shaft 16 and the circular cutout 57 is limited only by the surfaces of the elements from which measurements are taken and by the quality of the measuring instruments. An example of a measuring instrument which produces satisfactory alignment results is a Brown and Sharpe Electronic Model 992 with an electronic indicating head. Accurate alignment of the axes is accomplished, for example, by adjustment of the apparatus disclosed in my copending application Ser. No. 883,044 as hereinbefore mentioned. The adjustment apparatus is disposed proximate the four corners of the workpiece platform as illustrated in general in FIG. 4.

The workpiece 13 is securely mounted to the workpiece platform 12 by a resilient fork-like clamp 58 to insure that the workpiece is tightly engaged with the top surface of the workpiece platform 12. The workpiece 13, for example, a lens cell 76, is preferably formed as illustrated in FIG. 6. About the periphery of the lens cell 76 are two reference projections 78 and 80 spaced approximately 120° apart and disposed for engaging the circular surface 57 of the mounting block 56. A pivotal arm 60 is provided to exert a force against the periphery of the workpiece 13 to hold the workpiece 13 at its reference projectors in tight engagement with the circular cutout 57 in the mounting block 56, as typically illustrated in FIG. 6 for the lens cell 76. The pivotal arm 60 pivots about a shaft 62 affixed to the platform 12 and has a key 64 to urge the workpiece 13 into tight engagement with the mounting block 56. In FIG. 6, the key 64 is disposed within a recess 81 for positively locating the lens cell 76. To constantly hold the pivotal arm 60 tightly against the workpiece 13 there is provided a second pivotal arm 66 having a C-shaped resilient spring 68 affixed thereto at one end. The arm 66 is rotated to engage an outer lateral surface of the pivotal arm 60 and is transversely held thereto at a stop 70 provided at the head of the pivotal arm 60.

In FIG. 5, the operating spindle 16 is shown coaxially carrying either a boring tool 72 as illustrated by the broken lines or a trueing bell 74, illustrated in solid lines, for aligning a lens upon a bored lens cell. It will be appreciated that, for example, a retractable boring tool may be provided within a spindle carrying a trueing bell forming a dual-purpose tool for use in accomplishing multiple operations in a single machine without changing spindles or aligning another tool upon a single spindle. The use of a multiple purpose tool promotes accurate alignment since tolerance build-up caused by an increased number of alignment steps is decreased.

In operation the hand lever 18 is pivoted about the axis A—A established by the machine screws 46 in the direction of the arrow in FIG. 3 to engage the micrometer shaft 52 with the thrust bearing 42 to urge the spindle 16 downward against the force of the coil spring 53 to cause, for example, the boring tool 72 to engage the positioned workpiece 13, for example, the lens cell 76 to generate thereon an optical lens seating surface and generally to remove sufficient cell material to preclude contact of the lens with the cell at other than the seating surface. The seat formed upon the lens cell defines a plane which is parallel to the flat end surfaces of the lens cell.

Steps for mounting a lens upon the generated seat of the workpiece 13 involves either changing the boring tool 72 carried by the operating spindle 16 to a trueing bell 74, aligning it, placing the lens upon the positioned workpiece 13 and lowering the trueing bell 74 for coaxially aligning the axis of the lens with the axis of the lens cell seat or to position the workpiece 13 for trueing in a different but similarly constructed machine having like alignment characteristics and aligning the optical lens as hereinbefore mentioned. It is understood that a multiple purpose tool would eliminate these additional alignment steps. Once the boring and the aligning operations are complete, the lens is cemented to the lens cell in any suitable manner well known in the art.

It will be appreciated that by following the hereinbefore outlined methods and utilizing apparatus constructed according to the principles of the present invention, lens cells supporting optical lenses having their optical axes aligned to a selected axis passing through the optical lens cell and disposed substantially transversely to the ends of the cell may be provided.

Accuracy is achieved through the care and precision of the alignment between the operating spindle 16 and the circular positioning surface 57 of the mounting block 56. The lens cells need only have flat and parallel end surfaces accurately spaced and be engaged with the mounting block 56 in like ways during the boring and the trueing operations, to achieve these great accuracies. Consistent alignment and positioning enables the construction of accurate optical aligned lens cell assemblies for use in optical system comprising a plurality of lenses.

In the preferred embodiment illustrated in FIG. 6, the provided reference projections 78 and 80 insure that the lens cell 76 is coaxially mounted regardless of the machine in which it is positioned, since all machines will be similarly aligned, and of the assembly in which it is included, because of the indexing feature of the projections. The reference projections 78 and 80 eliminate the necessity of the outer surface of the lens cell 76 being near cylindrical and cut to a certain dimension within a generally tight tolerance. Since the reference projections 78 and 80 provide reference points for optical alignment of axes, it will be appreciated that the reference points form a common reference base to align a plurality of lens assemblies.

Figure 7:
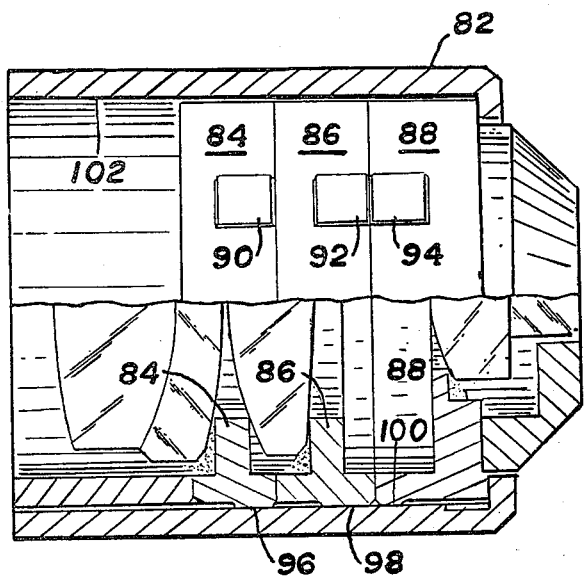
FIG. 7 is a fragmentary sectional view of an optical system incorporating optical lens cells, as illustrated in FIG. 6.
Figure 9:
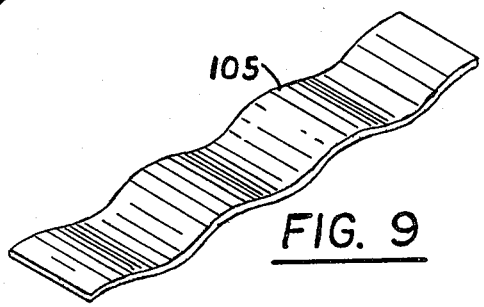
FIG. 9 is a resilient leaf spring for use in the optical system illustrated in FIG. 7.
Figure 8:
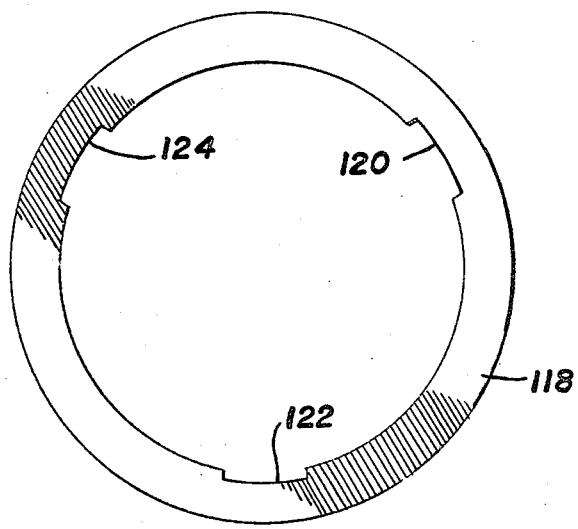
FIG. 8 is a cylindrical housing modified to include reference recesses for supporting optical lens cells as illustrated in FIG. 6.

This invention has advanced the state of the art since the individual lens assemblies constructed by the methods as hereinbefore mentioned, relate one to another to establish very accurate coaxial alignment between any number of lens assemblies. Apparatus for accomplishing the system alignment is illustrated in FIGS. 7, 8 and 9. A housing 82 supporting three lens cell assemblies 84, 86 and 88 is constructed according to the principles of the invention as shown in FIG. 7. Peripheral reference projections 90, 92 and 94 of lens cells 84, 86 and 88, respectively, are illustrated in perspective and projections 96, 98 and 100 in section. The projections 90, 92 and 94 and 96, 98 and 100 are disposed within a cylindrically formed bore 102 and bear against the inner surface of the housing 82. To insure tight engagement of the respective reference projections within the bore 102 and to align the respective reference projections colinearly, there is provided a resilient leaf spring 105 having regular periodic undulations for providing uniform engagement within an operating space defined by recesses similar to the recess 81 shown in FIG. 6 formed within each of the lens cells spaced approximate 120° from the projections. The spring 105 can be formed in any desirable configuration such as being doubled lengthwise to form a U-shaped trough. In FIG. 8 a modified housing 118 having longitudinal recesses 120, 122, and 124 for, respectively, receiving two reference projections of a lens cell and a leaf spring to provide tight engagement between the projections and the recess and to readily assume an aligned orientation when a plurality of cells are stacked to facillitate insertion of the leaf spring with the recesses of the lens cells and one of the recesses of the housing 118.

Figure 10:
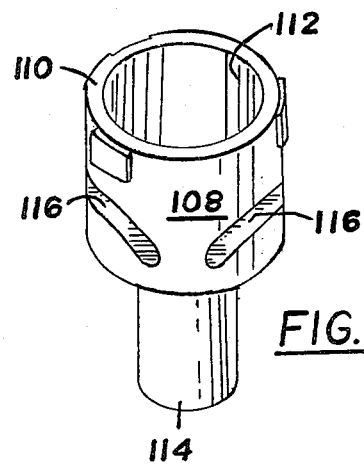
FIG. 10 is an optical cell for carrying a plurality of lenses according to the principles of the present invention.

By utilizing the methods taught herein it is possible to consider a lens cell system comprising two or more lenses mounted in a single lens cell 108 as illustrated in FIG. 10. Since the illustrated machines provide for coaxial alignment by the referencing of exterior lens cell projections to an aligned mounting block it is no more difficult to mount a second and third lens as it is to mount a first lens. Accordingly, the lens cell 108 of FIG. 10 is capable of carrying a lens substantially at the surface 110, another at the surface at the bottom of inner chamber 112 and another at the surface 114 disposed at the other end of the cell 108. Cutouts 116 are provided in the cell 108 to permit radiation to penetrate to the surface at the bottom of the chamber 112 to dry lens cell cement applied through the slots.

Having thusly described my invention in the hereinbefore described embodiments, I claim the following:

1. A cell for carrying an optical element upon a seat, comprising:
   a substantially cylindrical housing defining the seat for the optical element and having only two separate reference projections disposed about the periphery of the housing, each reference projection extending radially outward away from the seat and terminating at a curved surface of each projection comprising an outermost portion of the housing, each of which curved surfaces has a radius of curvature which is no greater than the radius of curvature of the cylindrical housing, to define an identifiable fixed reference point on each separate curved surface which separate points are respectively, disposed at that point along each of the outermost curved surfaces of the projections which is farthest from a centrally located axis passing through the center of the seat for the optical element, the reference points being spaced equal distances from the centrally located axis along respective lines extending orthogonally to the axis.

2. The cell for carrying an optical element as defined in claim 1, further including an optical element carried upon the seat of the housing of the cell, the optical element having an optical axis passing through the center of the seat and coincident with the centrally located axis.

3. The cell as defined in claim 1, wherein the housing has integral structure defining a plurality of seats for mounting a plurality of optical elements, one seat for each optical element, each reference projection point being spaced, from a centrally located axis passing through the center of each seat for each respective optical element, equal distances along respective lines extending orthogonally to the axis.

4. A lens assembly, comprising:
   a housing having an inner substantially cylindrical surface; and
   a plurality of substantially annularly shaped lens cells disposed within said housing, said cells each having a set of only two reference projections extending outwardly to each terminate at a reference point, each cell carrying a lens having an optical axis spaced at predetermined equal distances from the two reference points along respective lines extending orthogonally to each axis, the corresponding reference points of each set of projections colinearly aligned in a direction parallel to the optical axes of the lenses and contacting the inner surface to thereby coincidentially align the optical axes of the lenses.

5. An optical cell having a seat carrying an optical element having an optical axis, the optical cell being structured to readily optically align the axis of the carried optical element with the optical axis of a second optical element similarly carried by a second similarly structured and separate optical cell, comprising:
   a cell base defining only two spaced apart and fixed curved reference surfaces, each curved surface having one point extending orthogonally farther from the optical axis than any other part of the cell base and spaced an equal distance, along respective lines extending orthogonally from each of the points of the two curved surfaces, from the optical axis of the optical element passing through a center point of the seat, whereby at such time as the respective reference points of the reference surfaces of two similarly structured optical cells are aligned in the direction of the optical axes of the carried optical elements, the respective center points of the seats of the optical cells are thereby aligned providing for alignment of the optical axes of the optical elements carried by the respective optical cells to thereby optically align the elements.

6. The optical element and cell as defined in claim 5, wherein the cell base has a planar reference surface orthogonally disposed to the optical axis of the optical element, whereby at such time as planar reference surfaces of two similarly structured optical cells are disposed in parallel planes to each other and corresponding respective reference points of the curved surfaces of optical cells are aligned in the direction of the optical axes of the carried optical elements to define two lines parallel to each other and the optical axis, the optical axes of the optical elements carried by the respective optical cells are coaxially disposed and the optical elements are thereby optically aligned.

7. An optical cell holder for carrying a plurality of similarly structured optical cells to readily optically align optical axes of optical elements respectively carried by the optical cells, the optical axis of each optical element being disposed equal distances from each of two parallel lines each of which respectively extends through one of two fixed reference points on reference projections for each optical cell, comprising:

a cell container having an inner wall defining two spaced apart reference surfaces parallel to and spaced from a center line defining a geometric axis, the two reference surfaces and the geometric axis are spaced and oriented to respectively align the fixed reference points of the projections of each optical cell and the optical axis of each optical element carried by each optical cell in the same direction parallel to each other where each optical cell is disposed in a plane orthogonal to the reference surfaces, to thereby optically align the optical axes of the elements of the optical cells carried by the optical cell holder, including means for disposing the respective reference points of the reference projections of the optical cells to contact the respective reference surfaces of the optical cell holder.

8. The optical cell holder as defined in claim 7, wherein the reference surfaces are further defined by reference projections extending outwardly from the inner wall toward the geometric axis of the optical cell holder.

9. The optical cell holder having two spaced apart fixed reference lines, as defined in claim 7, wherein the reference surfaces are further defined by reference recesses extending inwardly from the inner wall away from the geometric axis of the optical cell holder.

10. An optical assembly having a plurality of optically aligned lenses, comprising:

two substantially similar optical cells each defined by a cell base having a planar reference surface and a pair of reference projections extending outwardly from a lateral cell surface substantially orthogonally disposed to said planar reference surface;

each optical cell carrying a lens having an optical axis orthogonally disposed to the planar reference surface of each respective optical cell with the optical axis of each lens spaced from each reference projection of its pair of reference projections a like distance along lines extending orthogonally from each optical axis of each optical lens to each respective point of the pair of reference projections for the optical cell; and the planar reference surfaces being disposed parallel to each other with the respective reference projections on each optical cell aligned in a direction extending parallel to the optical axis, to thereby coaxially optically align the optical axes of the respective lens carried by the cells.

* * * * *